United States Patent

Nagakubo et al.

[11] Patent Number: 6,097,438
[45] Date of Patent: Aug. 1, 2000

[54] SYSTEM FOR PROCESSING A PICTURE DATA SIGNAL FOR AN IMAGE DISPLAY DEVICE

[75] Inventors: Tetsuro Nagakubo; Manabu Honda, both of Yamanashi-ken, Japan

[73] Assignee: Pioneer Electronic Corporation, Tokyo, Japan

[21] Appl. No.: 09/090,976

[22] Filed: Jun. 5, 1998

[30] Foreign Application Priority Data

Jun. 6, 1997 [JP] Japan ..................... 9-165186

[51] Int. Cl.$^7$ ........................................... H04N 7/01
[52] U.S. Cl. ........................................... 348/445; 348/458
[58] Field of Search .................................. 348/445, 441, 348/443, 458, 459, 913, 556; H04N 7/01

[56] References Cited

U.S. PATENT DOCUMENTS

| | | | |
|---|---|---|---|
| 5,534,934 | 7/1996 | Katsumata et al. | 348/445 |
| 5,754,243 | 5/1998 | Kuribara et al. | 348/445 |
| 5,793,434 | 8/1998 | Lee | 348/445 |
| 5,847,768 | 12/1998 | Kang | 348/445 |
| 5,896,178 | 4/1999 | Inoue | 348/453 |

*Primary Examiner*—Michael H. Lee
*Attorney, Agent, or Firm*—Arent Fox Kintner Plotkin & Kahn, PLLC

[57] ABSTRACT

A one-line memory is provided for sequentially writing input picture data of one horizontal scanning line and for sequentially reading the written picture data. A plurality of expansion and contraction circuits are provided for increasing and decreasing the number of picture data of a plurality of sequentially inputted horizontal scanning lines. The expansion and contraction circuits produce picture data increased or reduced in line in dependency on coefficients. A picture memory is provided for storing the picture data from the expansion and contraction circuit.

3 Claims, 3 Drawing Sheets

FIG.3 a

| | m | m+1 | m+2 | m+3 | m+4 | m+5 |
|---|---|---|---|---|---|---|
| | Dn' | Dn" | Dn+1' | Dn+2' | Dn+2" | Dn+3' |

FIG.3 b

| | m | m+1 | m+2 | m+3 | m+4 | m+5 |
|---|---|---|---|---|---|---|
| | Dn' | Dn+2' | Dn+3' | Dn+5' | Dn+6' | Dn+8' |

SYSTEM FOR PROCESSING A PICTURE DATA SIGNAL FOR AN IMAGE DISPLAY DEVICE

BACKGROUND OF THE INVENTION

The present invention relates to a system for processing a digital picture data signal where the picture data signal for a screen of a particular size is converted to a picture data signal appropriate for a screen of another size.

An ordinary NTSC television receiver has a screen, the aspect ratio of which is 4:3. On the other hand, the screen of a cinema-size television receiver has the aspect ratio of 16:9. When picture data signals for the cinema-size television receiver are applied to the NTSC television receiver to show a picture on the screen thereof, there is formed non-displaying areas at upper and lower portions of the screen. Namely, a so-called letter box display is carried out. When the displaying picture is expanded in the vertical direction, the screen is efficiently used, thereby enabling to show a larger picture.

More particularly, such an expansion process of the picture is carried out as follows. An input image data is written in a frame memory in synchronism with an input clock signal, and read out from the frame memory in synchronism with an output clock signal, one line at a time. The read out image data is filtered by a vertical filter so that the number of scanning lines is increased, for example, by 4/3.

However, during the expansion process, since the processing rate at the input side, that is the signal source side, differs from that at the output side. Thus, it is necessary to provide a frame memory as a buffer so that an asynchronous components of the signal can be absorbed. As a result, the size of the circuit becomes large, thereby increasing the manufacturing cost thereof. Hence, a large scale integration is difficult to realize.

SUMMARY OF THE INVENTION

An object of the present invention is to provide a system for processing a picture data signal wherein the above-described problem is solved without necessitating a large frame memory.

According to the present invention, there is provided a system for processing a picture data signal for an image display device comprising, a one-line memory for sequentially writing input picture data of one horizontal scanning line and for sequentially reading the written picture data, a plurality of expansion and contraction circuits for increasing and decreasing the number of picture data of a plurality of sequentially inputted horizontal scanning lines, controls means for producing a control signal for determining expansion or contraction rate, coefficient generator means responsive to the control signal for generating coefficient signals and for applying the coefficient signals to the expansion and contraction circuits, thereby producing picture data increased or reduced in line, a picture memory for storing the picture data from the expansion and contraction circuit.

Each of the expansion and contraction circuits comprises a pair of multipliers, each receiving different coefficient from the coefficient generator means and multiplying the picture data of one line by the coefficient, and an adder for adding outputs of both the multipliers.

The system further comprises a plurality of line controllers, each responsive to the control signal for producing a write enable signal, and the selector means having memory control means responsive to the write enable signal for producing selecting signals, the picture memory responsive to the selecting signals for selecting picture data to be stored therein.

These and other objects and features of the present invention will become more apparent from the following detailed description with reference to the accompanying drawings.

BRIEF DESCRIPTION OF DRAWINGS

FIGS. 3a and 3b show sequences of picture data when a picture is expanded and contracted, respectively.

DETAILED DESCRIPTION OF THE PREFERRED EMBODIMENT

Figure 1:
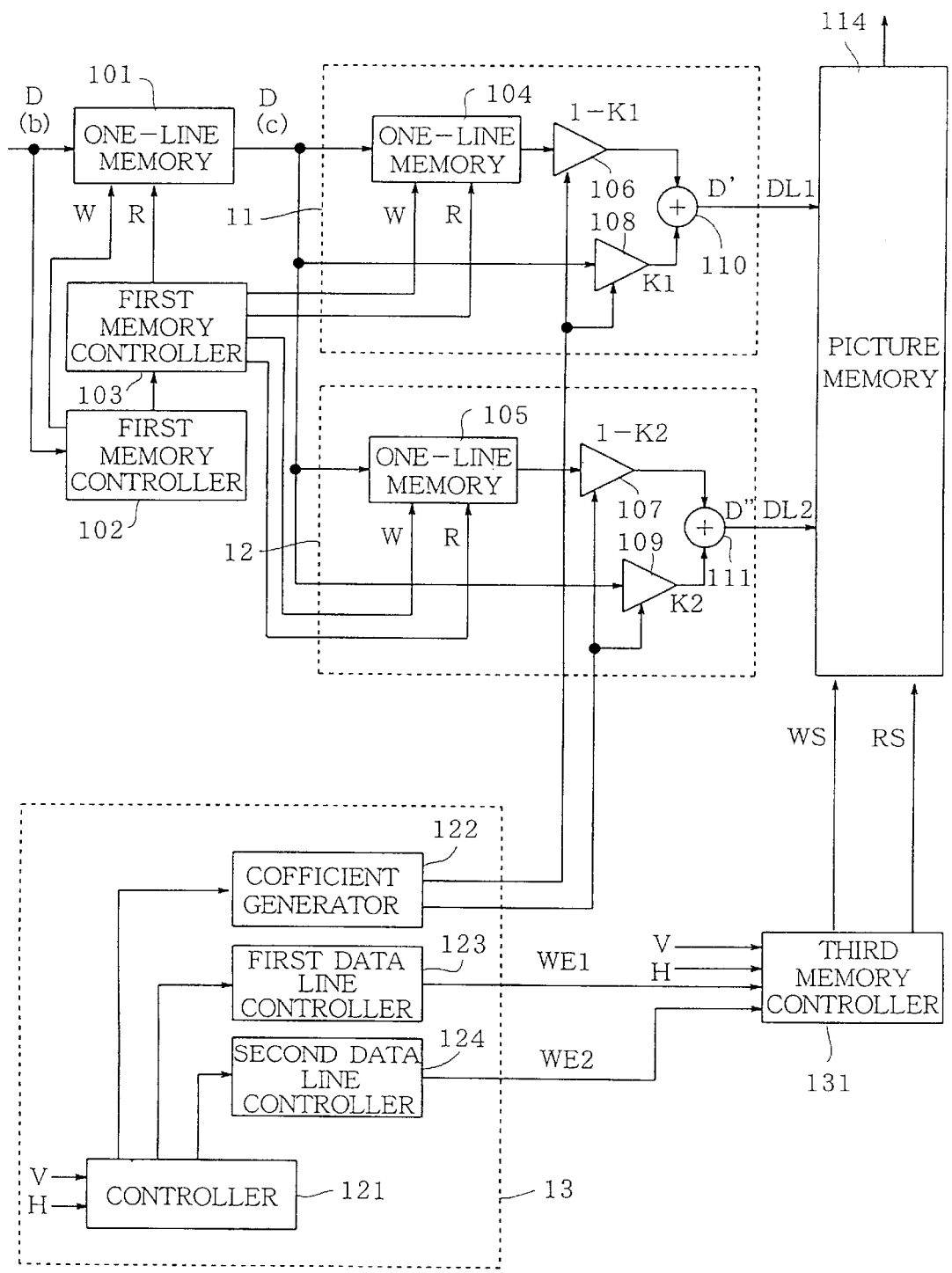
FIG. 1 is a block diagram showing a system for processing picture data signals in accordance with the present invention.

Referring to FIG. 1, a system for processing picture data signals of the present invention has a one-line memory 101, which is a buffer having a storage capacity sufficient for writing data of one horizontal scanning line of input picture data D. The one-line memory 101 comprises, for example, a fast-in fast-out memory (FIFO memory) where the writing and reading operations thereof can be independently and simultaneously executed.

Picture data D are written in the one-line memory 101 in accordance with a write control signal W applied from a first memory controller 102 in synchronism with a clock signal fed at the input of the system. The picture data D stored in the one-line memory 101 are read out from the one-line memory 101 in accordance with a read control signal R applied from a second controller 103 in synchronism with a clock signal at the output, hence absorbing the asynchronous components of the picture data.

The one-line memory 101 is parallelly connected to a first expansion and contraction circuit (interpolation circuit) 11 and a second expansion and contraction circuit 12. The first expansion and contraction circuit 11 has a one line memory 104 to which is applied the picture data D of one scanning line, read out from the one-line memory 101, in accordance with a write control signal W and the read control signal R from the second memory controller 103. The reading timing of the one-line memory 104 is such that picture data stored therein are retarded by 1H (horizontal scanning period). The retarded picture data D is fed to a first multiplier 106 so as to be multiplied by a coefficient 1-K1 fed from an expansion and contraction controller 13 which will be described later in detail.

The first expansion and contraction circuit 11 is further provided with a second multiplier 108 where the picture data D from the one-line memory 101 are multiplied by a coefficient K1 applied from the expansion and contraction controller 13. The outputs of the first and second multipliers 106 and 108 are applied to an adder 110 thereby forming a new converted picture data D' corresponding to one line.

The second expansion and contraction circuit 12 has a similar construction as the first expansion and contraction circuit 11 and has a one-line memory 105 to which are applied the picture data D of one line, read out from the one-line memory 101 in accordance with the write control signal W and the read control signal R from the second memory controller 103. The reading timing of the one-line memory 105 is such that picture data D stored therein is retarded by 1H. The retarded picture signal is fed to a first multiplier 107 so as to be multiplied by a coefficient 1-K2 fed from the expansion and contraction controller 13. A second multiplier 109 is further provided so that the picture data D from the one-line memory 101 are multiplied by a coefficient K2 applied from the memory control section 13. The outputs of the first and second multipliers 107 and 109 are applied to an adder 111 thereby forming another new converted picture data D" of one line.

Each of the one line memories 104 and 105 comprises a FIFO memory, for example.

The converted picture data D' and D" from the first and second expansion and contraction circuits 11 and 12 are applied to a picture memory 114 through a first data line DL1, and a second data line DL2, respectively.

The expansion and contraction controller 13 comprises a controller 121 which is fed with a vertical synchronizing signal V and a horizontal synchronizing signal H. The controller 121 generates a control signal which is applied to a coefficient generator 122. The coefficient generator 122 generates the coefficients K1, 1-K1, K2 and 1-K2 in accordance with the desired expansion or contraction rate in response to the control signal. The coefficients are fed to the multipliers 106, 108, 107 and 111 as hereinbefore described.

The control signal from the controller 121 is further fed to a first data line controller 123 and a second data line controller 124. The first data line controller 123 generates a write enable signal WE1 for rendering the first data line DL1 valid or void, thereby selecting the converted picture data of one line produced at the first expansion and contraction circuit 11 which may be stored in the picture memory 114. The second data line controller 124 generates a write enable signal WE2 for rendering the second data line DL2 valid or void, thereby selecting the converted picture data produced at the second expansion and contraction circuit 11 which may be stored.

More particularly, the write enable signals WE1 and WE2 are applied to a third memory controller 131 to which is also fed the vertical synchronizing signal V and the horizontal synchronizing signal H. The third memory controller 131 applies a write control signals WS at a timing determined by the write enable signals WE1 and WE2 from the data line controllers 123 and 124 of the expansion and contraction controller 13. Hence, the converted picture data D' and D" fed through the data lines DL1 and DL2 are written in the picture memory 114 dependent on the write control signal WS.

The picture data stored in the picture memory 114 are sequentially read out in response to a read control signal RS from the third memory controller 131, and applied to a display (not shown).

Figure 2:
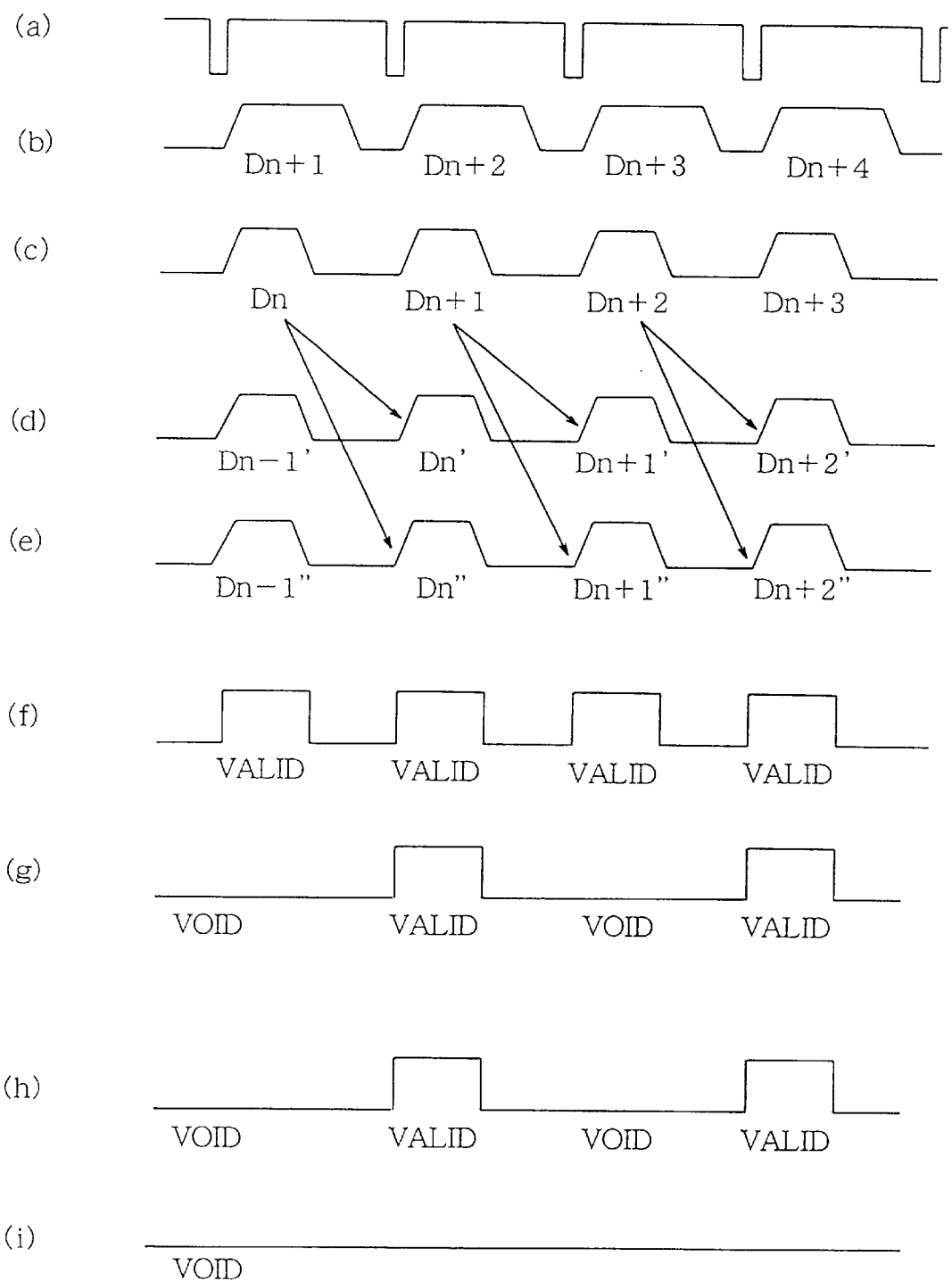
FIG. 2 show waveforms of various signals generated in the system of FIG. 1 during the operation thereof.

The operation of the system according to the present invention is described hereinafter with reference to FIGS. 2, 3a and 3b.

FIG. 2(a) shows an input horizontal synchronizing signal used in common for generating various signals shown in (b) to (i). FIGS. 2(b) to (g) show picture data signals produced when vertically expanding the picture 3/2 times and FIGS. 2(h) and (i) show picture data signals produced when vertically contracting the picture by 2/3. FIGS. 3a and 3b explain the order of picture data when expanding and contracting as above, respectively. FIGS. 3a and 3b show only the sequences of the picture data irrespective of the timing set by the input horizontal synchronizing signal of FIG. 2(a).

As shown in FIG. 2(b), a picture data Dn of a horizontal scanning line n is periodically fed to the one-line memory 101 in synchronism with the input horizontal synchronizing signal shown in FIG. 2(a). The picture data Dn is read out, also in synchronism with the input horizontal synchronizing signal, but at a timing retarded by one line as shown in FIG. 2(c). When the picture data of the line n is applied to the expansion and contraction circuit 11, picture data Dn-1 of the previous line, namely, the data corresponding to a line n-1, is multiplied by the coefficient 1-K1 at the first multiplier 106. Meanwhile, the picture data Dn of the line n is multiplied by the coefficient K1 at the second multiplier 108. A converted picture data Dn' shown in FIG. 2(d) generated at the adder 110 of the first expansion and contraction circuit 11 is as follows.

$$Dn'=(1-K1)Dn-1+K1 \times Dn$$

The picture data Dn of the line n are further applied to the second expansion and contraction circuit 12. At the first multiplier 107, the picture data Dn-1 of the previous line n-1 are multiplied at the coefficient 1-K2, and at the second multiplier 109, the picture data Dn of the line n are multiplied by the coefficient K2. The output of the multipliers 107 and 109 are fed to the adder 111 to generate a converted picture data Dn" shown in FIG. 2(e), namely Dn"=(1-K2) Dn-1+K2×Dn.

When expanding the picture by 3/2, the first data line controller 123 generates the write enable signal WE1 as shown in FIG. 2(f). The valid periods of the first data line DL1 coincide with those of the picture data D' (Dn', Dn+1', Dn+2" ... ) applied from the first expansion and contraction circuit 11 so that all of the picture data D' are written in the picture memory 114. On the other hand, the second data line controller 124 generates the write enable signal WE2 alternating the valid and void periods as shown in FIG. 2(g). Thus, the second line DL2 is voided during the period between the picture data Dn" and Dn+2".

Hence as shown in FIG. 3a, the picture data for lines m to m+5 are written in the picture memory 114 in sequence of the picture data Dn' of the first data line DL1, picture data Dn" of the second data line DL2, the picture data Dn+1', picture data Dn+2' both of the first data line DL1, picture data Dn+2" of the second data line DL2, and picture data Dn+3' of the first data line DL1. Namely, the picture data Dn+1" of the second data line DL2 is rendered void. The picture data for the following lines are processed in the same manner. Accordingly, the output picture data for three horizontal scanning lines are obtained from the input picture data of two horizontal scanning lines.

When contracting the picture by 2/3, the first data line controller 123 generates the write enable signal WE1 as shown in FIG. 2(h). In the three lines n to n+2, only the timings of the picture data Dn' and Dn+2' coincides with the valid periods of the first data line DL1, thereby rendering the data valid. To the contrary, the picture data Dn+1 of the line n+1 becomes void. The following picture data are processed in the same manner so that picture data Dn+1', Dn+4, Dn+7 are rendered void. On the other hand, the second data line controller 124 generates the write enable signal WE2 as shown in FIG. 2(i), thereby completely invalidating the second line DL2 so that all of the picture data from the second expansion and contraction circuit 12 are rendered void.

Thus input picture data corresponding to three lines are converted to output contracted picture data for two lines. FIG. 3b show the sequence of the contracted picture data thus obtained for the lines m to m+5.

In the processing system of the present invention, two expansion and contraction circuits and two data lines are provided so that two output data are obtained from each input data. Hence, the picture can be doubled expanded at maximum in the vertical direction.

The present invention may be modified to provide three expansion and contraction circuits and three data lines, in which case three output data can be derived from each input data. Thus, the picture can be expanded at a maximum rate of three times in the vertical direction.

From the foregoing it will be understood that the present invention provides a system for processing a picture data signal wherein the circuit of which is small in size, and which can be manufactured at a low cost, and further be formed into a large scale integrated device.

While the invention has been described in conjunction with preferred specific embodiment thereof, it will be understood that this description is intended to illustrate and not limit the scope of the invention, which is defined by the following claims.

What is claimed is:

1. A system for processing a picture data signal for an image display device comprising:

a one-line memory for sequentially writing input picture data of one horizontal scanning line and for sequentially reading the written picture data;

a plurality of expansion and contraction circuits for increasing and decreasing the number of picture data of a plurality of sequentially inputted horizontal scanning lines;

controls means for producing a control signal for determining expansion or contraction rate;

coefficient generator means responsive to the control signal for generating coefficient signals and for applying the coefficient signals to the expansion and contraction circuits, thereby producing picture data increased or reduced in line;

a picture memory for storing the picture data from the expansion and contraction circuit;

selector means for selecting picture data stored in the picture memory for performing expansion or contraction of an image of the image display device.

2. The system according to claim 1 wherein each of the expansion and contraction circuits comprises a pair of multipliers, each receiving different coefficient from the coefficient generator means and multiplying the picture data of one line by the coefficient, and an adder for adding outputs of both the multipliers.

3. The system according to claim 1 further comprising a plurality of line controllers, each responsive to the control signal for producing a write enable signal, and the selector means having memory control means responsive to the write enable signal for producing selecting signals, the picture memory responsive to the selecting signals for selecting picture data to be stored therein.

* * * * *